(12) United States Patent
Lu (10) Patent No.: US 10,502,642 B2
(45) Date of Patent: Dec. 10, 2019

(54) NON-CONTACT MAGNETOSTRICTIVE STRESS SENSOR WITH GAP COMPENSATION FIELD

(71) Applicant: General Electric Company, Schenectady, NY (US)

(72) Inventor: Dan Tho Lu, Minden, NV (US)

(73) Assignee: General Electric Company, Schenectady, NY (US)

( * ) Notice: Subject to any disclaimer, the term of this patent is extended or adjusted under 35 U.S.C. 154(b) by 332 days.

(21) Appl. No.: 15/598,057

(22) Filed: May 17, 2017

(65) Prior Publication Data
US 2018/0335352 A1 Nov. 22, 2018

(51) Int. Cl.
| H02J 50/10 | (2016.01) |
| H01F 38/14 | (2006.01) |
| H01F 27/24 | (2006.01) |
| H04B 5/00 | (2006.01) |
| H02J 7/02 | (2016.01) |
| G01L 1/12 | (2006.01) |
| G01D 5/24 | (2006.01) |

(52) U.S. Cl.
CPC ............ *G01L 1/125* (2013.01); *G01D 5/24* (2013.01); *H02J 7/025* (2013.01)

(58) Field of Classification Search
CPC .. H02J 7/025; H02J 50/90; H02J 50/10; H02J 50/60; G01L 1/125; G01L 3/105; G01L 3/102; G01L 1/127; G01L 1/122; G01V 3/10
See application file for complete search history.

(56) References Cited

U.S. PATENT DOCUMENTS

| 9,909,601 B2 * | 3/2018 | Heerdt | F15B 15/2861 |
| 2014/0366637 A1 * | 12/2014 | Brummel | G01L 3/105 73/779 |
| 2015/0323397 A1 * | 11/2015 | May | G01L 1/125 73/779 |
| 2017/0078400 A1 * | 3/2017 | Binder | H04L 67/12 |

* cited by examiner

*Primary Examiner* — Alesa Allgood
(74) *Attorney, Agent, or Firm* — Mintz Levin Cohn Ferris Glovsky and Popeo, P.C.

(57) ABSTRACT

Systems, devices, and methods for determining stress in a target are provided. The systems, devices, and methods facilitate detecting stress in the target using a sensor assembly. Using a sensor, raw stress signals, which can correspond to stress in the target, can be generated by detecting a magnetic flux that travels through the target. The raw stress signals can be sensitive to a gap between the sensor and the target. A proximity sensor element can be used to determine the size of the gap by generating an electric field between itself and the target. If the size of the gap changes, the strength of the electric field can change. Using a voltage of the proximity sensor element, a corresponding gap signal can be generated. The gap signal can be used to correct the raw stress signals, thereby creating corrected stress signals, which can correspond to stress values within the target.

18 Claims, 10 Drawing Sheets

NON-CONTACT MAGNETOSTRICTIVE STRESS SENSOR WITH GAP COMPENSATION FIELD

FIELD

Non-Contact stress measurement systems and processes are provided, and in particular systems and methods are provided for determining stress in a target.

BACKGROUND

Conductive materials have magnetostrictive properties that can cause the materials to change shape in the presence of an applied magnetic field. The inverse is also true. When a force is applied to a conductive material, magnetic properties of the material, such as magnetic permeability, can change. A magnetostrictive sensor can sense the changes in magnetic permeability and, because the changes can be proportional to the amount of stresses applied to the conductive material, the resulting measurement can be used to calculate the amount of stress.

However, magnetostrictive sensors can be sensitive to a separation distance between the sensor and a target material.

SUMMARY

Due to the sensitivity to the separation distance between a sensor and a target material, Accordingly, methods, systems, and devices, for correcting a magnetostrictive sensor output based on a separation distance are discussed herein. Sensor systems, assemblies, and methods are provided for sensing stress in a target. In one embodiment, a sensor assembly is provided and includes a support that has a central arm, and a drive element located on the central arm of the support. The drive element can be configured to induce a magnetic flux that travels through a first gap distance between a distal end of the central arm and a surface of a target, and through the target. The sensor assembly can also include at least one detection element coupled to the support and configured to detect the first magnetic flux, as well as a capacitive proximity sensor element. The capacitive proximity sensor element can be located at a fixed position relative to a distal end of the central arm, and it can be configured to generate an electric field with a surface of the target, and to generate a raw proximity signal based on a second gap between a distal surface of the capacitive proximity sensor element and the surface of the target.

In one embodiment, the detection element can include four detection elements that can be approximately equally spaced from the drive element and from one another.

In other embodiments, the drive element can be configured to receive an alternating current drive signal at a first frequency to generate the magnetic flux, and the capacitive proximity sensor element can be configured to receive an alternating current input proximity drive signal at a second frequency to generate the electric field.

In some embodiments, the sensor assembly can include a housing having the support, drive element, and the at least one detection element disposed therein.

The capacitive proximity sensor can be arranged on the sensor assembly in various ways, and in one embodiment the capacitive proximity sensor element can be embedded in a distal portion of the housing. In another embodiment, the capacitive proximity sensor element can be coupled to an interior surface of the housing. In yet another embodiment, the capacitive proximity sensor element can be coupled to an exterior surface of the housing.

In certain aspects, the at least one detection element can be on a second arm of the support. In other aspects, at least a portion of support can be made of a ferrite material.

In another embodiment, a sensor system is provided and includes a sensor assembly for sensing stress in a target. The sensor assembly can include a housing containing a first support, a first subsystem, and a second subsystem having a capacitive proximity sensor element. The first subsystem can be configured to generate a raw stress signal, and the second subsystem can be configured to generate a raw proximity signal. The sensor system can also include a drive system configured to deliver an input stress drive signal to the first subsystem, a proximity system configured, and a proximity system configured to deliver an input proximity drive signal to the second subsystem and to generate a reference signal that corresponds to the input proximity drive signal.

In one embodiment, the capacitive proximity sensor element can be coupled to an outer surface of the housing. In another embodiment, the capacitive proximity sensor element can be coupled to an inner surface of the housing.

In certain aspects, the sensor assembly can include a second support that has first and second adhesive surfaces. The capacitive proximity sensor element can be coupled to the first adhesive surface, and the second adhesive surface can couple the second support to the housing.

In other aspects, the first subsystem can include a drive element and at least one detection element. The drive element can be located on a first arm of the first support. The drive element can be configured to induce a first magnetic flux that travels through a target, and the at least one detection element can be configured to detect the first magnetic flux and generate the raw stress signal.

In some embodiments, the sensor assembly can include a gap processor configured to receive the reference signal and the raw proximity signal, and to calculate a gap signal that corresponds to a size of a gap between the capacitive proximity sensor element and a surface of a target. The sensor assembly can further include a gap compensation circuit configured to receive the raw stress signal and the gap signal and to generate a corrected stress signal. The corrected stress signal can correspond to a value of stress in the target.

Methods for sensing stress in a target are also provided. In one embodiment, a method can include delivering an input stress drive signal to a drive element of a sensor assembly, thereby inducing a magnetic flux that travels through a target. The method can also include detecting the magnetic flux, generating a raw stress signal based on the detected magnetic flux, delivering an initial proximity signal to a proximity circuit, delivering a reference signal to a gap processor, the reference signal corresponding to the initial proximity signal, delivering an input proximity drive signal to a capacitive proximity sensor element, generating a raw proximity signal based on a size of a gap between the capacitive proximity sensor element and the target, calculating a gap signal from the reference signal and the raw proximity signal, the gap signal corresponding to a voltage of the capacitive proximity sensor element, and calculating a corrected stress signal from the raw stress signal and the gap signal.

The drive signal and the input proximity drive signal can be alternating current signals, and the input stress drive signal can be at a first frequency and the input proximity drive signal can be at a second frequency. In some embodiments, the second frequency can be at least ten times greater than the first frequency.

In certain aspects, the capacitive proximity sensor element can generate an electric field between itself and a surface of the target, wherein the raw proximity signal varies with changes in the electric field.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

It can be desirable to monitor axial stress, bending, and/or torque of certain materials, such as, e.g., shafts of a turbine, to ensure that they are functioning within an appropriate operating range. One way to test for potential damage is to sense a stress applied to the material. Since these materials are often formed from a metal and have magnetic properties, and any change in the magnetic property can be proportional to the amount of stress applied to the target, sensors can be used to detect changes in magnetic properties of the material. The sensor can generate a stress signal that corresponds to the amount of stress within the target. A distance between the sensor and the target, however, can impact the quality of the stress signal. Accordingly, it can be beneficial to include a proximity sensor that can determine the distance between the sensor and the target. If the distance is known, the stress signal can be corrected for changes in the distance, and a corrected stress signal can be determined.

Figure 1:
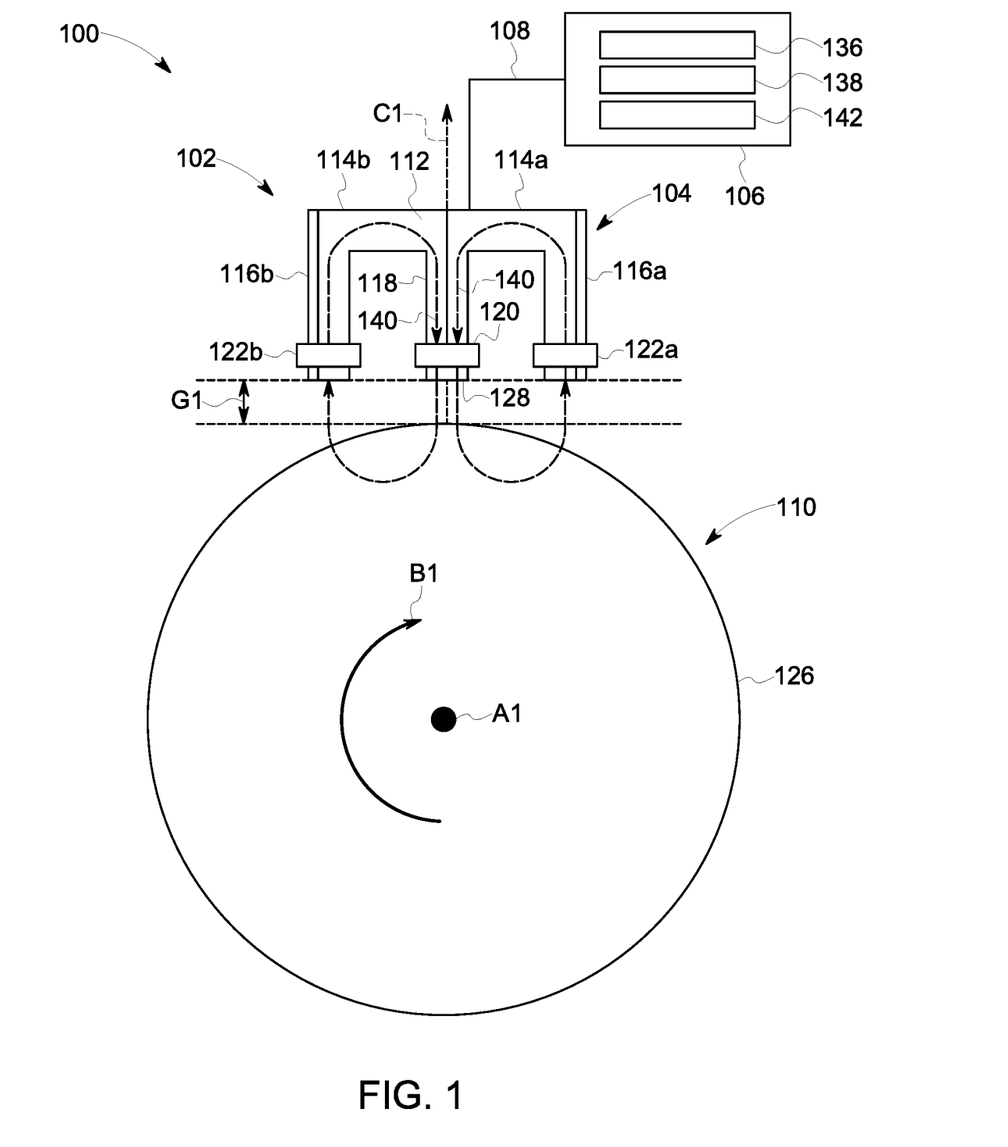
FIG. 1 is a side view of a sensor system for sensing stress such as torque, bending, and axial loading.

FIG. 1 illustrates a sensor system 100 for sensing stress such as torque, bending, and axial loading, applied to a conductive target. The sensor system 100 can include a sensor assembly 102 having a sensor head 104 which can be fixed within a housing (not shown), as well as a control and processing module 106. The sensor assembly 102 can be in communication with the control and processing module 106. As an example, the sensor assembly 102 can be connected to the control and processing module 106 via a cable 108 which can have multiple wires that can connect to components of the sensor head 104. The control and processing module 106 can be configured to send and receive signals to and from the sensor assembly 102. As shown in FIG. 1, the sensor assembly 102, including the sensor head 104, can be positioned over a target 110 which can rotate about axis A1, as indicated by arrow B1.

The sensor head 104 can include a support 112 that can have one or more support bars, for example, support bars 114a, 114b that extend radially outward from a central axis C1. The support 112 can be fabricated from a magnetic or ferromagnetic material such as, e.g., iron. Other possible materials that the support 112 can be made from can include, without limitation, ferrite material, silicon steel, or other materials with high magnetic permeability. The support bars 114a, 114b can have one or more detection arms, for example, detection arms 116a, 116b that extend distally therefrom toward the target 110. Additionally, the support 112 can include a central arm 118 that extends distally toward the target 110 along the central axis C1. The detection arms 116a, 116b can be spaced equidistant from the central arm 118. The lengths of the central arm 118 and the detection arms 116a, 116b can be the approximately equal, as shown in FIG. 1, or they can be different.

The sensor head 104 can further include a drive subsystem. The drive subsystem can include a drive element 120 located on the central arm 118 of the support 112, and detection elements 122a, 122b located on the detection arms 116a, 116b. The drive element 120 and the detection elements 122a, 122b can be located at the same distal position on their respective arms 118, 116a, 116b. Alternatively, the drive element 120 can be located at a different distal position than the detection elements 122a, 122b. While only two support bars 114a, 114b and two detection arms 116a, 116b are shown, the support 112 can include any number of support bars and detection arms. In certain embodiments, each arm can be spaced equidistant from the central arm 118.

As shown in FIG. 1, the sensor head 104 can be positioned above a surface 126 of the target 110, with a gap G1 between a distal end 128 of the central arm 118 and the surface 126 of the target 110. The drive element 120 and detection elements 122a, 122b can function as inductors, and they can be made of, e.g., copper wire or any other material suitable for the described purposes. For example, one or more segments of copper wire can be wound around the arms 118, 116a, 116b, of the support 112 to create the drive element 120 and detection elements 122a, 122b.

In operation, a power supply 136 of the control and processing module 106 can deliver an initial drive signal to an excitation module 138 which can deliver an input stress drive signal to the drive element 120 such that a magnetic flux 140, corresponding to a magnetic field, can be generated in the central arm 118 of the support 112. The excitation module 138 can adjust, filter, or modify the initial drive signal, thereby generating the input stress drive signal that can be delivered to the drive element 120. The excitation module 138 can also monitor returned signals detected by the drive element 120. In some embodiments, the initial drive signal can be the same as the input stress drive signal. The input stress drive signal can be, e.g., an alternating current (AC) signal. The magnetic flux 140 can travel from the central arm 118, through the gap G1, through the target 110, through the detection arms 116a, 116b, and back to the central arm 118 to form magnetic loops. As the magnetic flux 140 travels through the detection arms 116a, 116b, the detection elements 122a, 122b can detect the magnetic flux 140, and generate raw stress signals which can be delivered to a detection module 142. The support 112 can function to increase the magnetic flux density. Although not illustrated, the drive element 120 and detection elements 122a, 122b can have wires attached thereto, which can allow the elements 120, 122a, 122b to communicate with the control and processing module 106, where the wires can be bundle into the cable 108. In some embodiments, the drive element 120 and the detection elements 122a, 122b can be freestanding, and not coupled to arms 116a, 116b of the support 112.

The raw stress signals can correspond to magnitudes of stress within the target 110. Stress within the target 110 can correspond to, e.g., static stress or dynamic stress. For example, a torque, bending, or axial, stress in the target 110 can oscillate at a given frequency. In some embodiments, the detection module 142 can employ active or passive filtering techniques to filter raw stress signals, thereby creating filtered raw stress signals. The raw stress signals can be current signals or voltage signals. Although both current and voltage can be measured, it can be preferable to measure voltage since current measurements can have a relatively low signal to noise ratio.

Magnetic properties, such as magnetic permeability, of the target 110 can change as a result of a change in stress within target 110. Therefore, changes in the detected magnetic flux 140 can correspond to changes in the stress within target 110. Although changes in the detected magnetic flux 140 can correspond to changes in the stress state of the target 110, the detected magnetic flux 140 can also be sensitive to the size of gap G1, i.e. the distance between the terminal end of arms 118, 116a, 116b and the outer surface 126 of the target 110. Therefore, the raw stress signals, corresponding to the detected magnetic flux 140, can be a function of a stress state of the target 110 as well as the size of gap G1. Accordingly, it can be desirable to know the size of gap G1 so that the raw stress signals can be corrected based on the size of the gap G1, and a corrected stress signal can be determined.

Figure 2:
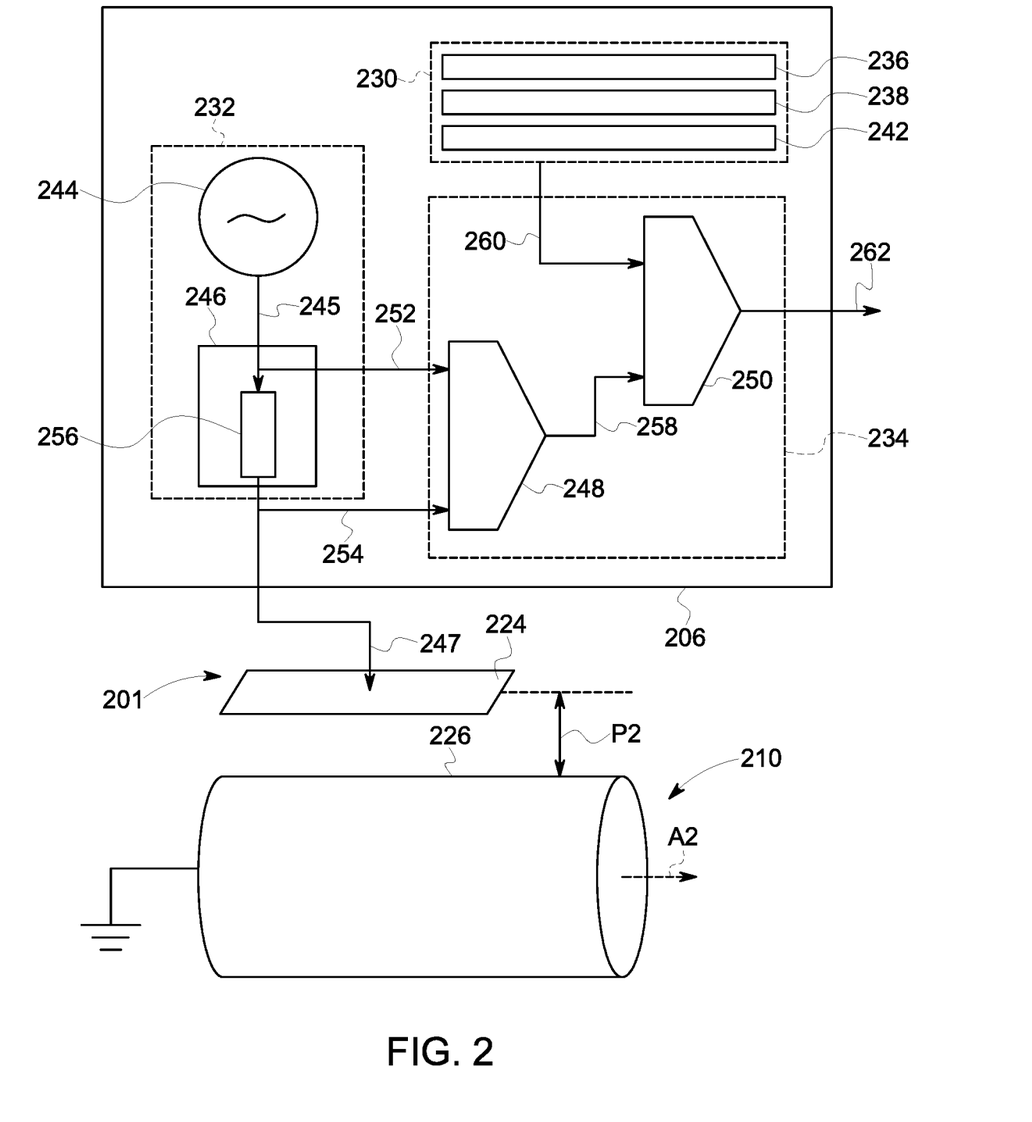
FIG. 2 is a diagram of a proximity subsystem and a control and processing module that can be used determine a size of a gap between a stress sensor and a target.

FIG. 2 shows a diagram of a proximity subsystem 201 and a control and processing module 206 that can be used within a sensor system similar to sensor system 100. The sensor system can include a sensor assembly having a drive subsystem including a drive element and at least one detection element. The drive element and detection element(s) can be similar to drive element 120 and detection elements 122a, 122b, described above. The proximity subsystem 201 can include a proximity sensor element 224 which can be mounted to a support (not shown). The support can be, e.g., a portion of a sensor housing, or it can be attached to the housing. The proximity sensor element 224 can function as a first terminal of a capacitor, and it can be in the form of a sheet or plate made of, e.g., copper, aluminum, or any other electrically conductive material suitable for the described purpose. For example, a copper sheet can be attached to an interior, or exterior, surface of the sensor housing to create the proximity sensor element 224.

The control and processing module 206 can include a drive system module 230, a proximity system module 232, and an analysis module 234. The drive system module 230 can include a power supply 236, an excitation module 238, and a detection module 242. The power supply 236, excitation module 238, and detection module 242 can generally function similarly power supply 136, excitation module 138, and detection module 142 described above with regard to sensor system 100. The proximity system module 232 can include an AC signal generator 244 and a proximity module 246, and can be configured to send and receive signals to and from the proximity subsystem 201. The analysis module 234 can include a gap processing module 248, and a gap compensation module 250, and can be configured to send and receive signals to and from the drive subsystem, the proximity subsystem 201, the drive system module 230, and the proximity system module 232.

As described above with regard to sensor system 100, stress in a target 210 can be determined by detecting a magnetic flux that travels through the target 210. As an example, the target 210 can be a shaft that can be rotatable about an axis A2. The magnetic flux can be detected by detection elements (not shown) of the sensor assembly, which can generate raw stress signals based on the detected magnetic flux. Although changes in the detected magnetic flux can be a result of changes in stress within the target 210, the changes in the detected first magnetic flux can also be dependent on changes in the size of a gap between a distal end of an arm of the sensor head where the drive element can be located and the surface 226 of the target 210, as described with regard to gap G1 above.

Gap P2 can correspond to a gap distance between a distal surface of the proximity sensor element 224 and the surface 226 of the target 210. The size of gap P2 can be approximately equal to the size of the gap between the distal end of the arm where the drive element can be located, and the surface 226 of the target 210, as described with regard to gap G1 above. Alternatively, a difference between the size of gap P2 and the size of the gap between the distal end of the arm where the drive element can be located can be known such that the difference can be taken into account during calculations. The size of the gap P2 can be determined using proximity sensor element 224, which can generate a raw proximity signal that can be delivered to a gap processing module 248.

In the illustrated embodiment, the AC signal generator 244 of the proximity system module 232 can deliver an initial proximity signal 245 to the proximity module 246 which can deliver an input proximity drive signal 247 to the proximity sensor element 224. The proximity module 246 can adjust or modify the initial proximity signal 245, thereby generating the input proximity drive signal 247, as well as monitor returned signals detected by the proximity sensor element 224. The input proximity drive signal 247 can be, e.g., an AC signal. Accordingly, the proximity sensor element 224 can receive a charge and generate an electric field that can extend across the gap P2, between the proximity sensor element 224 and the surface 226 of the target 210. Therefore, the proximity sensor element 224 can act as the first terminal of the capacitor, and the target 210 can act as a second terminal of the capacitor, where the target 210 can be grounded.

If the size of gap P2 is constant, the electric field can be constant. Therefore, a voltage measured at the proximity sensor element 224 can be constant. If the size of the gap P2 changes, the strength of the electric field between the proximity sensor element 224 and the surface 226 of the target 210 can change. Accordingly, a voltage measured at the proximity sensor element 224 can vary inversely with the size of gap P2. In other words, a capacitance of the proximity sensor element and the surface 226 of the target 210 can vary inversely with the size of gap P2.

The gap processing module 248 can measure a reference signal 252, based on the initial proximity signal 245, and a raw proximity signal 254. This raw proximity signal 254 can be dependent on the input proximity drive signal 247 delivered to the proximity sensor element 224. As an example, the reference signal 252 and raw proximity signal 254 can correspond to voltages measured across an isolating resistor, or buffer resistor, which can be a part of the proximity module 246. The raw proximity signal 254 can be approximately equal to a voltage measured at the proximity sensor element 224.

The gap processing module 248 can use the reference signal 252 and the raw proximity signal 254 to calculate the capacitance of the proximity sensor element 224 and the surface 226 of the target 210. The gap processing module 248 can then generate a gap signal 258 which can be proportional to, or vary with, the capacitance of the proximity sensor element 224 and the surface 226 of the target 210. In some embodiments the gap processing module 248 can generate the gap signal 258 based on relative changes in the raw proximity signal 254, and/or relative differences between the raw proximity signal 254 and the reference signal 252, without determining the capacitance of the proximity sensor element 224 and the surface 226 of the target 210. In such an embodiment, the gap signal 258 can be proportional to, or vary with the relative changes in the raw proximity signal 254, and/or relative differences between the raw proximity signal 254 and the reference signal 252.

A gap compensation module 250 can receive the gap signal 258 from the gap processing module 248, as well one or more raw stress signals 260 from detection elements of the sensor assembly, or from the detection module 242 of the drive system module 230. The gap compensation module 250 can use the gap signal 258 and raw stress signals 260 to calculate one or more corrected stress signals 262. The corrected stress signals 262 can correspond to values of stress in the target 210. Additionally, stress vectors can be determined based on different raw stress signals from each of the detection elements. Therefore, increasing the number of detection elements on the sensor head can increase the resolution of the stress vectors.

In some embodiments the processing and control module 206 an actively or passively filter signals. In some embodiments, the gap processing module 248 can employ active or passive filtering techniques to filter the raw proximity signal 254 and/or the reference signal 252, thereby creating a filtered raw proximity signal 254 and/or a filtered reference signal 252. The gap processing module 248 can also adjust the raw stress signal to account for a difference in the size of gap P2 and the size of the gap between the distal end of the arm having the drive element, and the surface 216 of the target 210.

As another example, the proximity module 246 can employ active or passive filtering techniques to filter the initial proximity signal 245, thereby creating a filtered reference signal 252. Alternatively, the reference signal 252 can be the same as the initial proximity signal 245. In some embodiments the gap processing module 248 can employ active or passive filtering techniques to filter the reference signal 252, thereby creating a filtered reference signal. In some embodiments, the gap compensation module 250 can employ active or passive filtering techniques to filter raw stress signals 260, thereby creating filtered raw stress signals. Additionally, the gap compensation module 250 can filter the gap signal 258.

In some applications, a benefit of using a capacitive proximity sensor element rather than an inductive proximity sensor element is that the electric field generated by the capacitive proximity sensor element will have a minimal interference effect on the magnetic flux from the drive subsystem, and on the components of the drive subsystem. Therefore, the number of design considerations can be reduced, and simpler circuits can be used to take measurements and calculate stress.

Although FIG. 2 illustrates a certain arrangement of modules, systems, and components within proximity processing module 206, one skilled in the art will understand that these modules, systems, and components can be arranged and categorized in a number of different ways. For example, the gap processing module 248 can be included in the proximity system module 232, rather than the analysis module 234, and such a configuration can be called a capacitive sensor module. In some embodiments certain modules, systems, and components, can be located on/in the sensor assembly. For example, certain modules, systems, and components of the proximity system module 232, or the capacitive sensor module, can be located on/in the sensor assembly.

Figure 3:
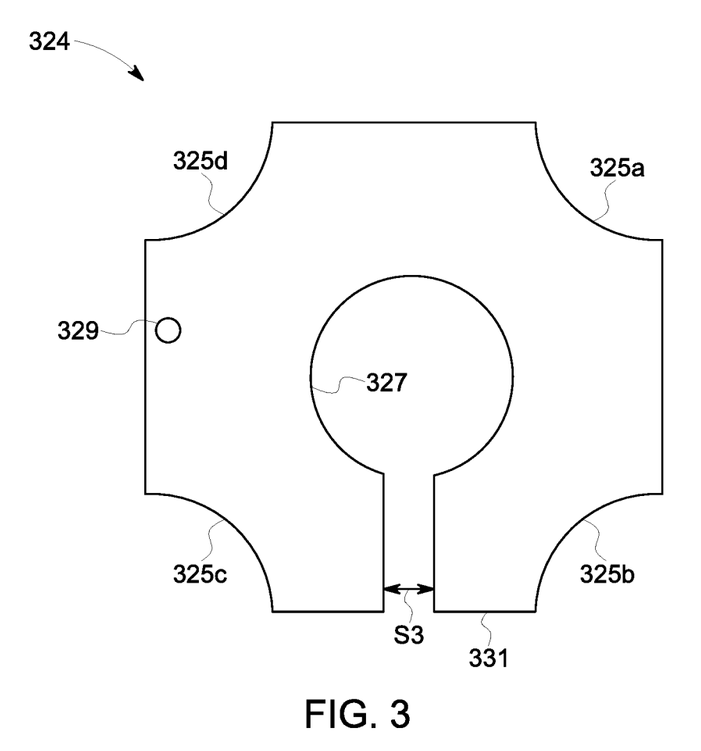
FIG. 3 is a top view of an embodiment of a proximity sensor element.

Although FIG. 2 shows a rectangular proximity sensor element 224, a proximity sensor element can include features that can improve functionality when used with a stress sensor system similar to stress sensor system 100. FIG. 3 illustrates an example of a proximity sensor element 324 that can be used within a sensor assembly similar to sensor assembly 102. The proximity sensor element 324 can be in the form of a plate, or sheet, having one or more cutouts, for example, outer cutouts 325a, 325b, 325c, 325d that can correspond to positions of detection arms of a support, and/or a central cutout 327 that can correspond to a position of a central arm of a support. The proximity sensor element 324 can also include a gap S3 that can extend from an outer edge 331 of the proximity sensor element 324 to the central cutout 327.

The cutouts 325a, 325b, 325c, 325d, 327 can allow a magnetic flux, generated by a drive element, to travel from the central arm of the support, and be received by the detection arms of the support, without experiencing significant interference from the proximity sensor element 324. The gap S3 can function to prevent the magnetic flux from creating eddy currents that could circulate around the central cutout 327. If the eddy currents were allowed to circulate uninhibited, they could generate a magnetic flux that could interfere with the magnetic flux that is generated by the drive element and detected by detection elements. Such interference can result in attenuation of, and/or erroneous, raw stress signals generated by the detection elements which can result in incorrect stress measurements. In some embodiments, the proximity sensor element 324 can include a pin or tab 329 that can be used to deliver an AC signal to the proximity sensor element. For example, a wire that can provide AC power can be soldered to the tab 329. Alternatively, the wire can be attached to the tab 329 in any way that facilitates AC signal delivery to the proximity sensor element 324.

Figure 4A:
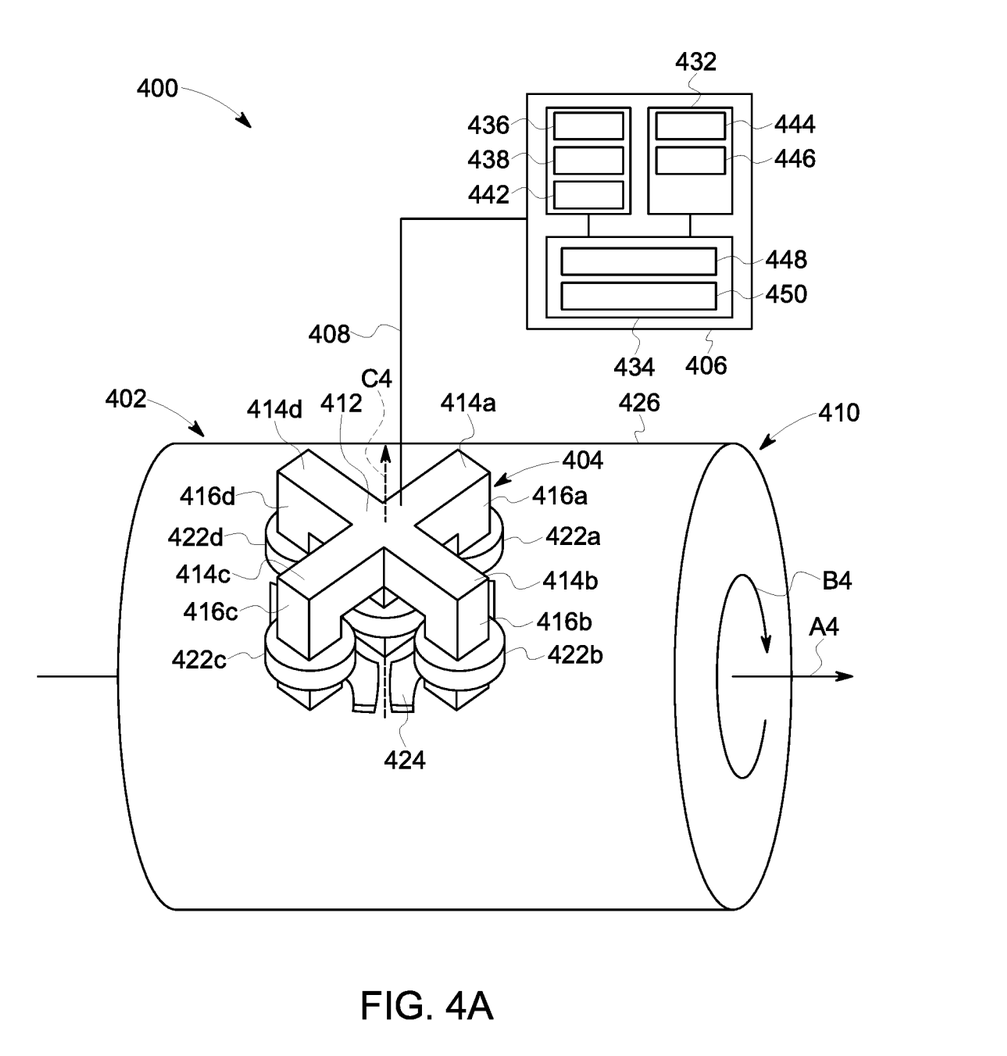
FIG. 4A is a side perspective view of one embodiment of sensor system for sensing stress that includes a proximity sensor element co-located with a drive element.
Figure 4B:
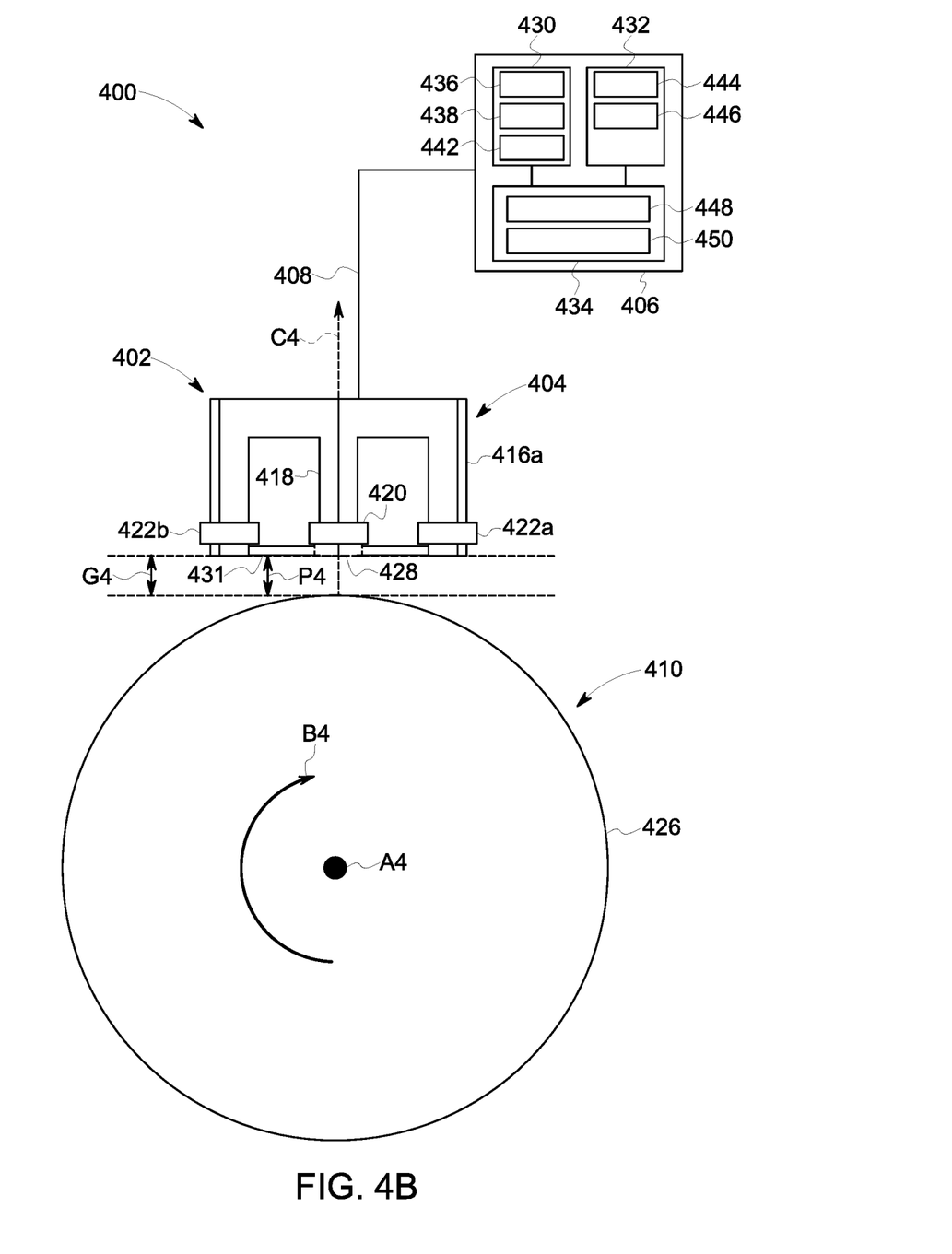
FIG. 4B is a side view of the sensor system of FIG. 4A.
Figure 4C:
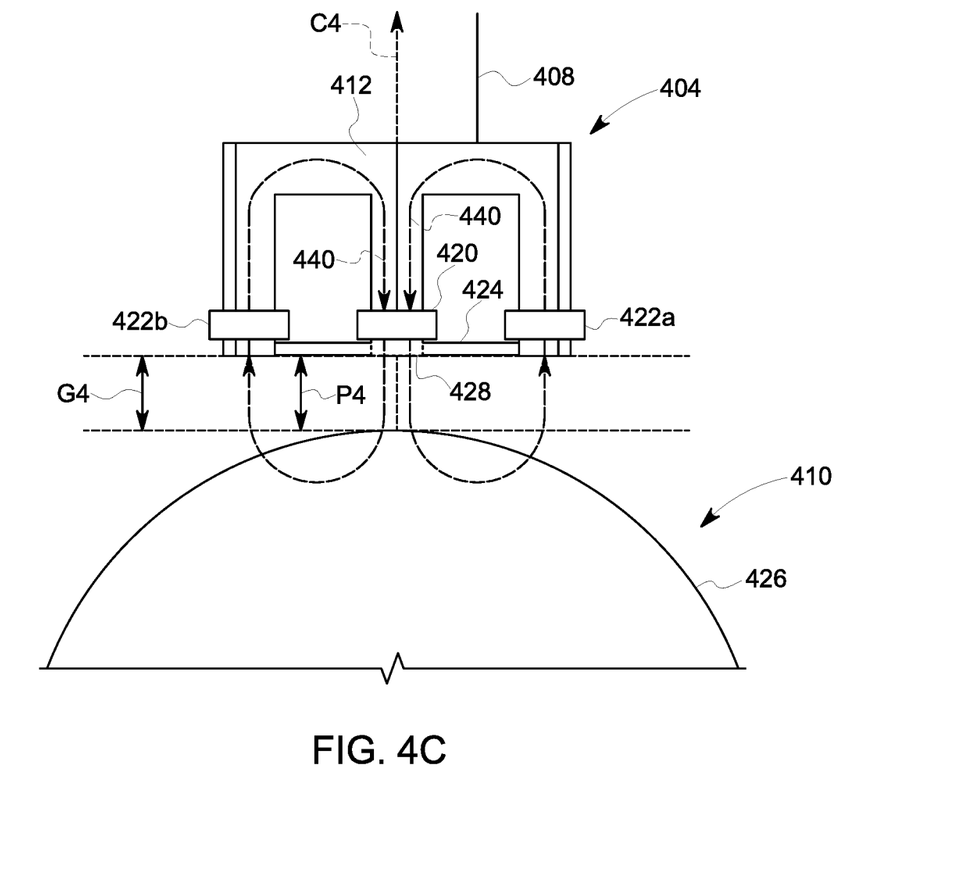
FIG. 4C is an enlarged side view of the sensor system shown in FIG. 4B.

FIGS. 4A-4C show another embodiment of a sensor system 400 for sensing stress such as torque, bending, and axial loading, induced in a conductive target. The stress sensor system 400 can generally be similar to stress sensor system 100, but in this embodiment the stress sensor system 400 can include a proximity sensor element 424 on a central arm 418 for detecting the size of gap G4. FIG. 4A shows a perspective view of the sensor system 400, FIG. 4B shows a side view, and FIG. 4C shows an enlarged side view. The sensor system 400 can include a sensor assembly 402 having a sensor head 404 and a housing (not shown), as well as a control and processing module 406. The sensor assembly 402 can be connected to the control and processing module 406 via a cable 408 which can have multiple wires that can connect to components of the sensor head 404. The control and processing module 406 can function to send and receive signals to and from the sensor assembly 402.

As shown in FIGS. 4A-4C, the sensor assembly 402, including the sensor head 404, can be positioned over a target 410 which can rotate about axis A4, as indicated by arrow B4. The sensor head 404 can include a first support 412 that can have support bars 414a, 414b, 414c, 414d that extend radially outward from a central axis C4. The first support 412 can generally be similar to support 112. The support bars 414a, 414b, 414c, 414d can have detection arms 416a, 416b, 416c, 416d that extend distally from the support bars 414a, 414b, 414c, 414d toward the target 410. Additionally, the support 412 can include a central arm 418 that extends distally toward the target 410 along the central axis C4. The detection arms 416a, 416b, 416c, 416d can be spaced equidistant from the central arm 418, as well as equidistant from each other. Although the illustrated first support 412 shows the detection arms spaced equidistant from each other, other embodiments can have support arms that are spaced at various asymmetric intervals.

The sensor head 404 can further include a drive subsystem and/or a proximity subsystem. The drive subsystem can include a drive element 420 located on the central arm 418 of the support 412, and detection elements 422a, 422b, 422c, 422d located on the detection arms 416a, 416b, 416c, 416d. The proximity subsystem can include the proximity sensor element 424 which can be mounted on a second support (not shown). The drive element 420, detection elements 422a, 422b, 422c, 422d, and proximity sensor element 424 can generally be similar to drive element 120, detection elements 122a, 122b, and proximity sensor elements 224, 324.

As shown in FIGS. 4B-4C, the sensor head 404 can be positioned above a surface 426 of the target 410 where there is some gap G4 between a distal end 428 of the central arm 418 and the surface 426 of the target 410. As described above with regard to proximity sensor element 224, the proximity sensor element 424 can generate a raw proximity signal corresponding to the size of gap P4 between a distal surface 431 of the proximity sensor element 424 and the surface 426 of the target 410. In the illustrated embodiment, the distal surface 431 of the proximity sensor element 424 can be aligned with the distal end 428 of the central arm 418 of the first support 412 such that the drive gap G4 and the proximity gap P4 can be approximately equal. Alternatively, the distal surface 431 of the proximity sensor element 424 and the distal end 428 of the central arm 418 can be at different distal positions such that the sizes of the proximity gap P4 and drive gap G4 are not equal. The difference between the sizes of the drive gap G4 and the proximity gap P4 can be known such that it can be accounted for prior to, or during, a process to determine a corrected stress signal or value.

As stated above, the control and processing module 406 can function to send and receive signals to and from the sensor assembly 402. The control and processing module 406 can include a drive system module 430, a proximity system module 432, and an analysis module 334. The drive system module 430 can include a power supply 436, an excitation module 438, and/or a detection module 442. The power supply 436, excitation module 438, and detection module 442 can generally be similar to power supply 136, excitation module 138, and detection module 142. The proximity system module 432 and analysis module 434 can generally be similar to proximity system module 232 and analysis module 234. The proximity system module 432 can include an AC signal generator 444 and a proximity module 446. The analysis module 434 can include a gap processing module 448, and a gap compensation module 450.

The power supply 436 of the drive system module 430 can deliver an initial drive signal to the excitation module 438 which can generate an input stress drive signal that can be delivered to the drive element 420 such that a first magnetic flux 440, corresponding to a first magnetic field, can be generated in the central arm 418 of the first support 412. The excitation module 438 can adjust, filter, and/or modify the initial drive signal, thereby generating the input stress drive signal that can be delivered to the drive element 420, as well as monitor returned signals detected by the drive element 420. In some embodiments, the initial drive signal can be the same as the input stress drive signal. The input stress drive signal can be, e.g., an AC signal at a first frequency. The first magnetic flux 440 can travel from the central arm 418, through the gap G4, through the target 410, through the detection arms 416a, 416b, 416c, 416d, and back to the central arm 418 to form a magnetic loop. As the magnetic flux 440 travels through the detection arms 416a, 416b, 416c, 416d, the detection elements 422a, 422b, 422c, 422d can detect the magnetic flux 440, and generate raw stress signals, based on the detected magnetic flux 440, which can be delivered to a detection module 442. In some embodiments, the detection module 442 can employ active or passive filtering techniques to filter raw stress signals, thereby creating filtered raw stress signals.

Although not illustrated, the drive element 420 and detection elements 422a, 422b, 422c, 422d can have wires attached thereto, which can allow the elements 420, 422a, 422b, 422c, 422d to communicate with the control and processing module 406, where the wires can be bundle into cable 408. The raw stress signals can be current signals or voltage signals. Although both current and voltage can be measured, it can be preferable to measure voltage since current measurements can have a relatively low signal to noise ratio.

As described above, the magnetic properties of the target can be altered if a stress state of the target 410 is altered. Therefore, changes in the detected magnetic flux 440 can correspond to changes in the stress state of the target 410. However, the detected magnetic flux 440 can also be sensitive to the size of gap G4. Therefore, the raw stress signals, corresponding to the detected magnetic flux, can vary based on the stress state of the target 410 as well as the size of gap G4. Accordingly, it can be desirable to know the size of gap G4 so that the raw stress signal can be corrected based on the size of the gap G4, and a corrected stress signal can be determined.

The size of gap P4 can be determined using the proximity sensor element 324, as described above with regard to proximity sensor element 224 shown in FIG. 2. Therefore, the size of gap G4 can also be determined. The proximity sensor element 424 can generate a raw proximity signal which can be delivered the control and processing module 406. The magnitude of the raw proximity signal can vary inversely with the size of gap G4.

In operation, the AC signal generator 444 of the proximity system module 432 can deliver an initial proximity signal to the proximity module 446 which can deliver an input proximity drive signal to the proximity sensor element 424. The input proximity drive signal can be, e.g., an alternating current (AC) signal at a second frequency. Accordingly, the proximity sensor element 424 can receive a charge and generate an electric field that can extend across the gap P4, between the proximity sensor element 424 and the surface 426 of the target 410. Therefore, the proximity sensor element 424 can act as the first terminal of a capacitor, and the target 210 can act as a second terminal of the capacitor, where the target 410 can be grounded. If the size of the gap P4 changes, the strength of the electric field between the proximity sensor element 424 and the surface 426 of the target 410 can change. Accordingly, a voltage measured at the proximity sensor element 424 can vary inversely with the size of gap P4. In other words, a capacitance of the proximity sensor element and the surface 426 of the target 410 can vary inversely with the size of gap P4.

In an exemplary embodiment, the magnitude of the second frequency can be at least ten times greater than the magnitude of the first frequency. That is, the frequency of the input proximity drive signal can be at least ten times greater than the frequency of the input stress drive signal in order to avoid interference between the drive subsystem and the proximity subsystem. By controlling the frequencies of the input stress drive signal and the input proximity drive signal independently, the drive subsystem and the proximity subsystem can be individually optimized to serve their respective purposes and minimize interference.

For a given initial proximity signal, if capacitance of the proximity sensor element 424 and the surface 426 of the target 410 changes, the input signal delivered to the proximity sensor element 424 can change. In other words, if the size of gap P4 changes, a voltage measured at the proximity sensor element 424 can change. Therefore, the raw proximity signal, dependent on the voltage of the proximity sensor element 424, can be measured by the gap processing module 448. As described above, the size of gaps G4 and P4 can be approximately equal. Alternatively, a difference between the sizes of gaps G4 and P4 can be known such that the size of gap G4 can be found if the size of gap P4 is known. As described above with regard to gap processing module 248, the gap processing module 448 can employ active or passive filtering techniques to filter the raw proximity signal, thereby creating a filtered raw proximity signal.

The gap processing module 448 can also measure a reference signal, based on the initial proximity signal, from the proximity module 346. The reference signal and the raw proximity signal, both of which can be filtered or unfiltered, can be current signals or voltage signals. Although both current and voltage can be measured, it can be preferable to measure voltage since current measurements can have a relatively low signal to noise ratio. Therefore, the reference signal and raw proximity signal can be measured across a buffer resistor, or current limiting resistor, of the proximity module 446.

In some embodiments, the gap processing module 448 can employ active or passive filtering techniques to filter the reference signal, thereby creating a filtered reference signal. In some embodiments, the gap processing module can adjust the raw proximity signal to adjust for a known difference between the size of gap P4 and the size of gap G4. As another example, the proximity module 446 can employ active or passive filtering techniques to filter the initial proximity signal, thereby creating a filtered reference signal. Alternatively, the reference signal can be the same as the initial proximity signal. The gap processing module 448 can use the reference signal and the raw proximity signal to calculate a gap signal.

The gap compensation module 450 can receive the gap signal from the gap processing module 448, as well as raw stress signals, which can be filtered or unfiltered, from the detection module 442. In some embodiments, the gap compensation module can receive the raw stress signals from the detection elements 422a, 422b, 422c, 422d. The gap compensation module 450 can further filter and/or amplify the gap signal and/or the raw stress signals, and use gap signal and raw stress signals to calculate corrected stress signals. In some embodiments, the gap compensation module 450 can adjust the gap signal to account for a known difference between the size of gap P4 and the size of gap G4. The corrected stress signals can correspond to values of stress in the target 310.

As described above, the initial drive signal, initial proximity signal, raw stress signals, and the raw proximity signal can be filtered. For example, filtering methods utilizing inductors and capacitors can ensure that loop impedance is high for interfering signals. Small capacitance values in series with the proximity sensor element 424 can ensure that the magnetic flux 440, at low frequency, from the drive element 420 does not couple significantly. An inductance of the detection elements 422a, 422b, 422c, 422d, which can be added or be a characteristic of the detection elements 422a, 422b, 422c, 422d, can ensure that the magnetic flux created by the proximity sensor element 424, at high frequency, has a limited interference effect on the detection elements 422a, 422b, 422c, 422d. Any other component of the control and processing module 406 can employ similar signal filtering techniques.

Figure 5A:
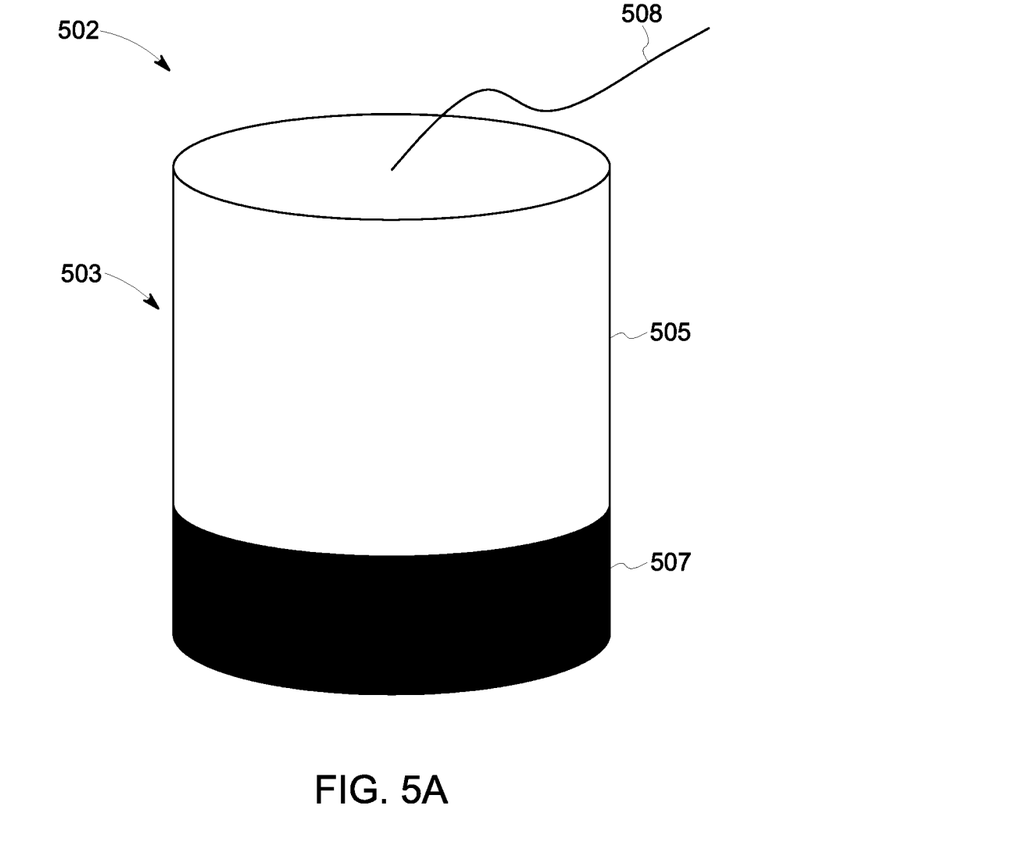
FIG. 5A is a perspective view of an embodiment of a sensor assembly with a housing.
Figure 5B:
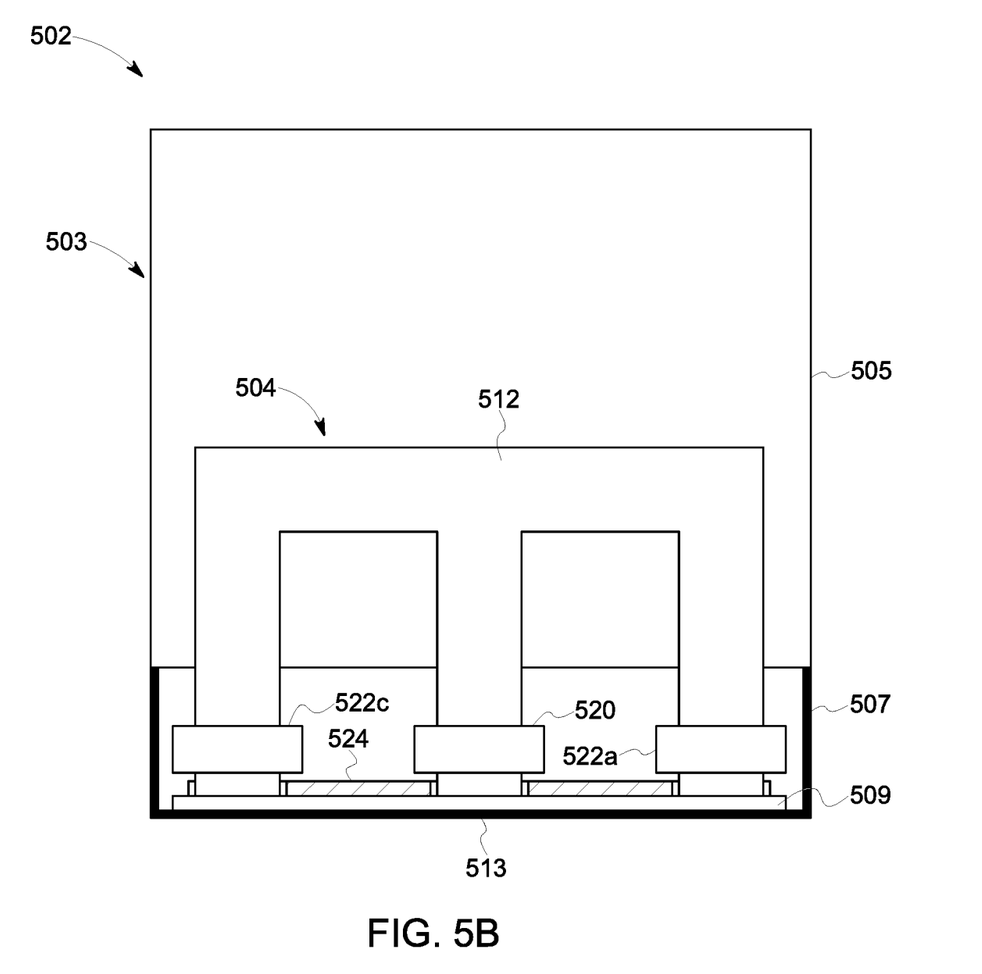
FIG. 5B is a side cross-section view of the sensor assembly shown in FIG. 5A where a proximity sensor element is adhered to an inner surface of the assembly.
Figure 5C:
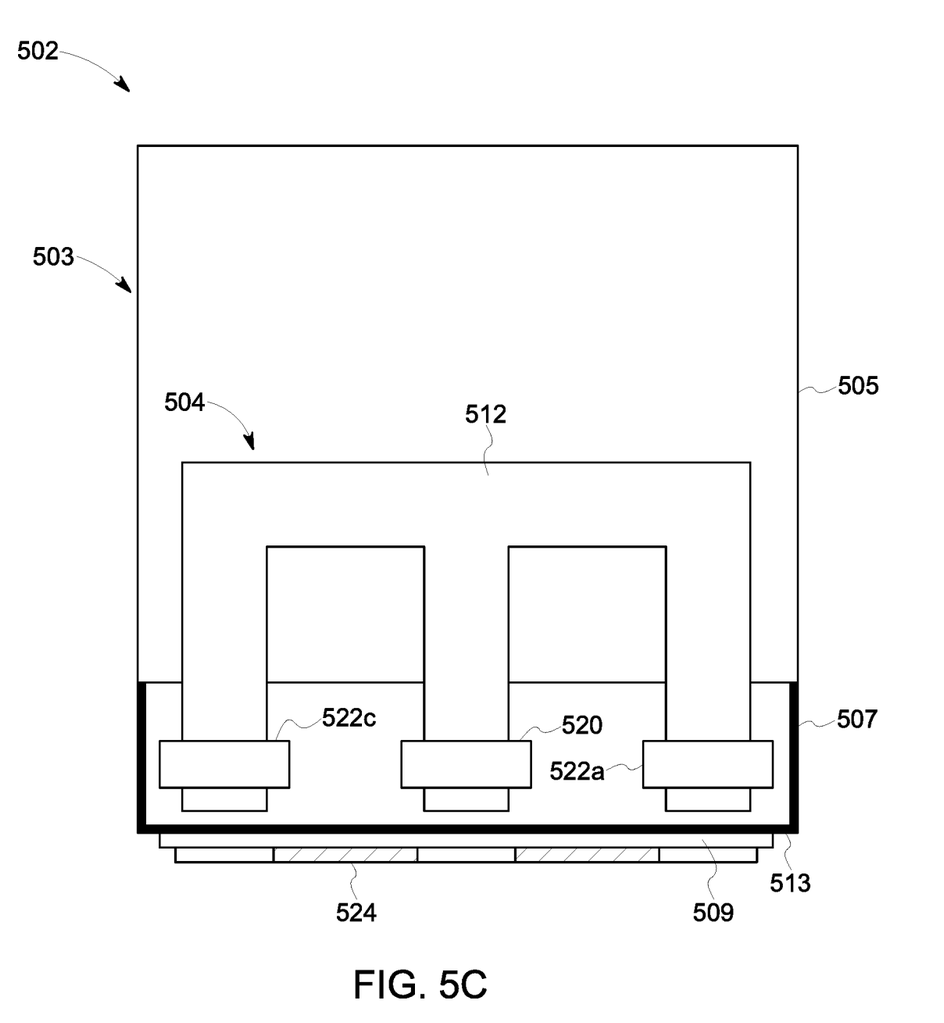
FIG. 5C is a side cross-section view of the sensor assembly shown in FIG. 5A where a proximity sensor element is adhered to an outer surface of the sensor assembly.

FIGS. 5A-5B show an embodiment of a sensor assembly 502 that includes a housing 503 having a cable 508 attached thereto. FIG. 5A shows a perspective view of the sensor assembly 502, FIG. 5B shows a side cross-section view of the sensor assembly 502, and FIG. 5C shows a side cross-section view of sensor assembly 502 where a proximity sensor element 524 is adhered to an outer surface of the housing 503. The sensor assembly 502 can generally be similar to sensor assembly 402, and it can be used in a sensor system that can generally be similar to sensor system 400. Therefore, the sensor assembly 502 can include the housing 503 which can have a sensor head 504 having a first support 512, a drive subsystem, and a proximity subsystem disposed therein. The drive subsystem can include a drive element 520 and least one detection element 522a, 522c, and the proximity subsystem can include a proximity sensor element 524 as explained above. The sensor head 504, first support 512, drive element 520, detection elements 522a 522c, and proximity sensor element 524 can be similar to sensor head 404, support 412, drive element 420, detection elements 422a, 422b, 422c, 422d, and proximity sensor element 424.

The housing 503 can include a proximal portion 505 and a distal portion 507. The proximal portion 505 can be made out of, e.g., stainless steel, aluminum, or another metal. The distal portion 507, where the drive subsystem and proximity subsystem can reside, can be made out of a non-conductive material such as, e.g., a ceramic or a moldable, machinable, polymer. The non-conductive nature of the distal portion 507 can function to prevent magnetic fields generated by the drive element from coupling with the housing 403.

Figure 5D:
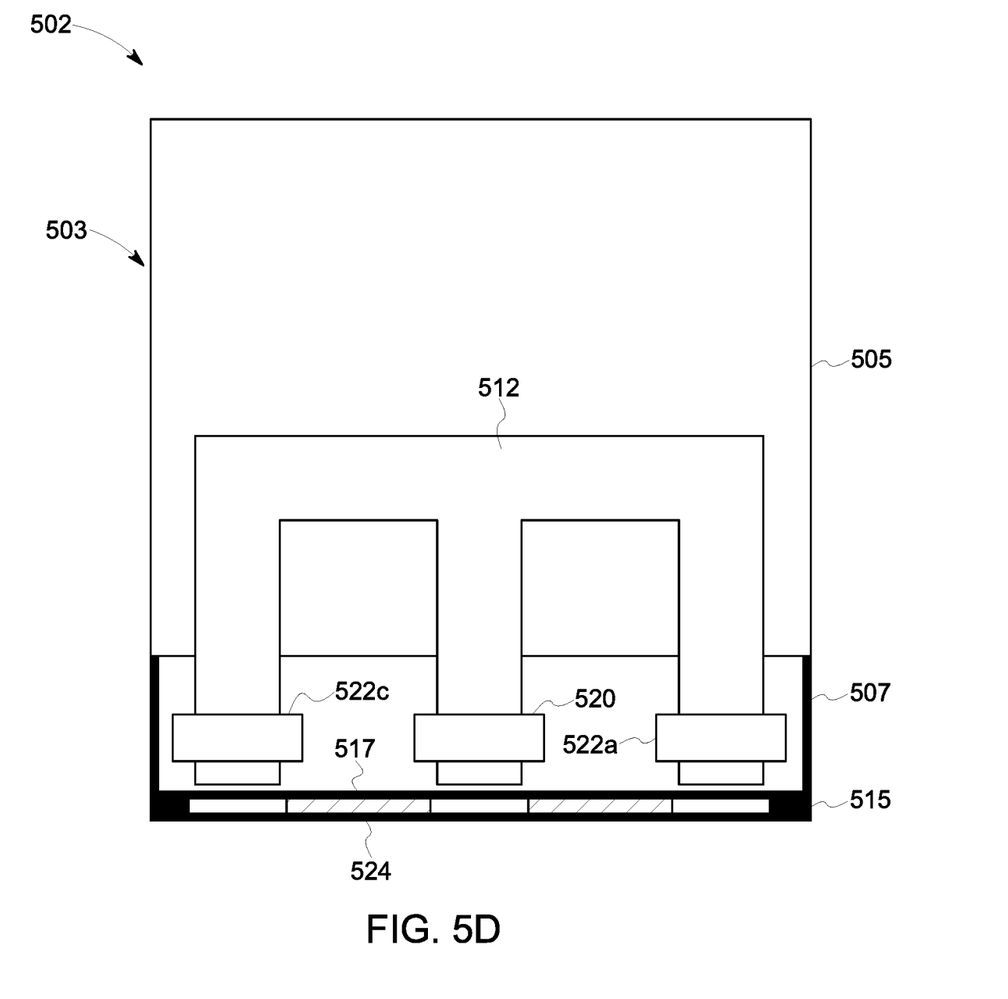
FIG. 5D is a side cross-section view of the sensor assembly shown in FIG. 5A where a proximity sensor element embedded in a housing of the sensor assembly.

In the illustrated embodiment, the proximity sensor element 524 is coupled to an interior surface of the distal portion 507 of the housing 503 via a second support 509, which can be an adhesive or other suitable coupling mechanism. In some embodiments, the second support 509 can have first and second adhesive surfaces that can adhere to the proximity sensor element 524 and to the housing 503. The proximity sensor element can be coupled to the first adhesive surface, and the second adhesive surface can be coupled to the housing. In some embodiments, the proximity sensor element 524 can be adhered to an outer surface 513 of the distal portion 507 of the housing 503, as illustrated in FIG. 5C. In other embodiments, the proximity sensor element 524 can be coupled to the housing by electro-plating, or lamination. FIG. 5D shows an example of a proximity sensor element 524 that can be integrated, or embedded, into the distal portion 507 of the housing. For example proximity sensor element 524 can be laminated into an end portion 515 of the distal portion 507 of the housing 503 using, e.g. a polymer, ceramic, or any other nonconductive material suitable for the described task. The distal portion 507 of the housing 503 can include an access point 517 that can allow the proximity sensor element 524 to be access from the inside of the housing 503 to deliver an input proximity drive signal.

Although arms of the supports 112, 412, 512 are illustrated as having square or rectangular cross-sections, the cross-sections of the arms of the supports 112, 412, 512, can be any shape suitable for the described purpose. For example, the arms can be cylindrical and can have circular cross-sections. Bonding or embedding the proximity sensor element to the housing 503 can improve signal quality, and significantly reduce manufacturing costs and errors associated with installation error.

Other embodiments are within the scope and spirit of the disclosed subject matter.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A sensor assembly, comprising:
    a housing including
        a proximal end and a distal end;
        a first support including a first arm oriented with respect to a central axis extending through the first support;
        a second support including a second arm;
        a drive element located on the first arm of the first support and configured to induce a first magnetic flux that travels through a first gap distance between a distal end of the first arm and a surface of a target, and through the target;
        at least one detection element coupled to the second arm of the second support and configured to detect the first magnetic flux; and
        a capacitive proximity sensor element located at a fixed position relative to the distal end of the first arm and configured to generate an electric field with a surface of the target, and to generate a raw proximity signal based on a second gap between a distal surface of the capacitive proximity sensor element and the surface of the target, the capacitive proximity sensor element laminated within an end portion of the distal portion of the housing, wherein the distal portion of the housing includes an access point configured to provide access to the capacitive proximity sensor element from inside the housing.

2. The sensor assembly of claim 1, wherein the at least one detection element comprises four detection elements being approximately equally spaced from the drive element and from one another.

3. The sensor assembly of claim 1, wherein the drive element is configured to receive an alternating current drive signal at a first frequency to generate the first magnetic flux, and the capacitive proximity sensor element is configured to receive an alternating current input proximity drive signal at a second frequency to generate the electric field.

4. The sensor assembly of claim 1, wherein the capacitive proximity sensor element is coupled to an interior surface of the housing.

5. The sensor assembly of claim 1, wherein at least a portion of support is made of a ferrite material.

6. The sensor assembly of claim 1, wherein the capacitive proximity sensor element is laminated within the end portion of the distal portion of the housing using a non-conductive polymer material or a non-conductive ceramic material.

7. A sensor system, comprising:
    a sensor assembly for sensing stress in a target, the sensor assembly including a housing, the housing including
        a proximal end and a distal end,
        a first support including a first arm oriented with respect to a central axis extending through the first support,
        a second support including a second arm,
        a first subsystem configured to generate a raw stress signal, and
        a second subsystem having a capacitive proximity sensor element, the second subsystem being configured to generate a raw proximity signal and including a capacitive proximity sensor element laminated within an end portion of the distal portion of the housing, wherein the distal portion of the housing includes an access point configured to provide access the capacitive proximity sensor element from inside the housing;
    a drive system configured to deliver an input stress drive signal to the first subsystem, the drive system including a drive element located on the first arm of the first support and at least one detection element coupled to the second arm of the second support; and
    a proximity system configured to deliver an input proximity drive signal to the second subsystem, and generate a reference signal that corresponds to the input proximity drive signal.

8. The sensor system of claim 7, wherein the capacitive proximity sensor element is coupled to an outer surface of the housing.

9. The sensor system of claim 7, wherein the capacitive proximity sensor element is coupled to an inner surface of the housing.

10. The sensor system of claim 7, further comprising a second support, the second support having first and second adhesive surfaces, wherein the capacitive proximity sensor element is coupled to the first adhesive surface, and the second adhesive surface couples the second support to the housing.

11. The sensor system of claim 7, wherein the first subsystem includes a drive element and at least one detection element, the drive element being located on a first arm of the first support and being configured to induce a first magnetic flux that travels through a target, and the at least one detection element being configured to detect the first magnetic flux and generate the raw stress signal.

12. The sensor system of claim 7, further comprising a gap processor configured to receive the reference signal and the raw proximity signal, to calculate a gap signal that corresponds to a size of a gap between the capacitive proximity sensor element and a surface of a target.

13. The sensor system of claim 12, further comprising a gap compensation circuit configured to receive the raw stress signal and the gap signal and to generate a corrected stress signal, wherein the corrected stress signal corresponds to a value of stress in the target.

14. A method of sensing stress in a target, comprising:
delivering a input stress drive signal to a drive element of a sensor assembly including a housing including a distal portion and a proximal portion, thereby inducing a magnetic flux that travels through a target;
detecting the magnetic flux;
generating a raw stress signal based on the detected magnetic flux;
delivering an initial proximity signal to a proximity circuit;
delivering a reference signal to a gap processor, the reference signal corresponding to the initial proximity signal;
delivering an input proximity drive signal to a capacitive proximity sensor element laminated within an end portion of the distal end of the housing, the input proximity drive signal delivered by coupling a proximity subsystem configured within the distal end of the housing to the capacitive proximity sensor via an access point configured within the distal portion of the housing, wherein the proximity subsystem is configured to generate the input proximity drive signal delivered to the capacitive proximity sensor;
generating a raw proximity signal based on a size of a gap between the capacitive proximity sensor element and the target;
calculating a gap signal from the reference signal and the raw proximity signal, the gap signal corresponding to a voltage of the capacitive proximity sensor element; and
calculating a corrected stress signal from the raw stress signal and the gap signal.

15. The method of claim 14, wherein the capacitive proximity sensor element generates an electric field between itself and a surface of the target, wherein the raw proximity signal varies with changes in the electric field.

16. The method of claim 14, wherein the drive signal and the input proximity drive signal are alternating current signals, and the input stress drive signal is at a first frequency and the input proximity drive signal is at a second frequency.

17. The method of claim 16, wherein the second frequency is at least ten times greater than the first frequency.

18. A sensor assembly, comprising:
a housing including
a proximal end and a distal end;
a first support including a first arm oriented with respect to a central axis extending through the first support;
a second support including a second arm;
a drive element located on the first arm of the first support and configured to induce a first magnetic flux that travels through a first gap distance between a distal end of the first arm and a surface of a target, and through the target;
at least one detection element coupled to the second arm of the second support and configured to detect the first magnetic flux; and
a capacitive proximity sensor element located at a fixed position relative to the distal end of the first arm and configured to generate an electric field with a surface of the target, and to generate a raw proximity signal based on a second gap between a distal surface of the capacitive proximity sensor element and the surface of the target, the capacitive proximity sensor element adhered to an exterior surface of the distal end of the housing via an adhesive third support having first and second adhesive surfaces and extending across a portion of the exterior surface of the distal end of the housing, wherein the capacitive proximity sensor element is adhered to the first adhesive surface and the second adhesive surface is adhered to the exterior surface of the distal end of the housing.

* * * * *